United States Patent
Kirby et al.

(10) Patent No.: US 7,022,381 B2
(45) Date of Patent: Apr. 4, 2006

(54) METHOD FOR PRODUCING HIGH DIELECTRIC STRENGTH MICROVALVES

(75) Inventors: Brian J. Kirby, San Francisco, CA (US); David S. Reichmuth, Oakland, CA (US); Timothy J. Shepodd, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 318 days.

(21) Appl. No.: 10/610,093

(22) Filed: Jun. 30, 2003

(65) Prior Publication Data

US 2004/0123658 A1 Jul. 1, 2004

Related U.S. Application Data

(60) Provisional application No. 60/423,159, filed on Nov. 1, 2002.

(51) Int. Cl.
*C08F 2/46* (2006.01)
*C08J 7/18* (2006.01)
*B05D 7/22* (2006.01)

(52) U.S. Cl. .................. 427/487; 427/554; 427/235

(58) Field of Classification Search .............. 427/230, 427/235, 487, 553, 595, 508, 554, 596
See application file for complete search history.

(56) References Cited

OTHER PUBLICATIONS

Hasselbrink, Jr., et al., "High Pressure Microfluidic Control in Lab-on-a-Chip Devices Using Mobile Polymer Monoliths," Anal. Chem. 2002, 74, 4913-4918.*
Kirby et al., "Voltage-addressable on/off microvalves for high-pressure microchip separations," Journal of Chromatography A, 979 (2002) 147-154.*

* cited by examiner

*Primary Examiner*—Timothy Meeks
*Assistant Examiner*—William Phillip Fletcher, III
(74) *Attorney, Agent, or Firm*—Donald A. Nissen

(57) ABSTRACT

A microvalve having a cast-in-place and lithographically shaped mobile, polymer monolith for fluid flow control in microfluidic devices and method of manufacture. The microvalve contains a porous fluorinated polymer monolithic element whose pores are filled with an electrically insulating, high dielectric strength fluid, typically a perfluorinated liquid. This combination provides a microvalve that combines high dielectric strength with extremely low electrical conductivity. These microvalves have been shown to have resistivities of at least 100 G$\Omega$ and are compatible with solvents such as water at a pH between 2.7 and 9.0, 1-1 propanol, acetonitrile, and acetone.

10 Claims, No Drawings

METHOD FOR PRODUCING HIGH DIELECTRIC STRENGTH MICROVALVES

CROSS-REFERENCE TO RELATED APPLICATIONS

This application claims priority to, prior provisional U.S. Patent Application Ser. No. 60/423,159 originally filed Nov. 1, 2002 entitled "HIGH DIELECTRIC STRENGTH MICROVALVE INSULATORS" from which benefit is claimed.

STATEMENT OF GOVERNMENT INTEREST

This invention was made with Government support under contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

FIELD OF THE INVENTION

The invention is directed generally to microvalves containing a "cast-in-place" hybrid polymer/fluid valving means for controlling the flow of fluid and current through microchannels and methods for fabricating same. These valving means comprise porous fluorinated polymer monolithic materials whose pores are filled with an electrically insulating, high dielectric strength fluid thereby providing a structure that combines high dielectric strength with extremely low electrical conductivity.

BACKGROUND OF THE INVENTION

Microvalves for microfluidic devices can be made that comprise generally a "cast-in-place" mobile monolithic polymer element disposed within a microchannel and driven by a displacing force that can be fluid (either liquid or gas) pressure or an electric field to provide for control of fluid flow. As a means for controlling fluid flow, these microvalves possess the additional advantage that they can be used to effect pressure and electric field driven flows, eliminate or enhance diffusive or convective mixing, inject fixed quantities of fluid, and selectively divert flow from one channel to various other channels. They can also be used to isolate electric fields and, as a consequence, locally isolate electroosmotic or electrophoretic flows. The mobile polymer monolith microvalve architectures embodied in U.S. patent application Ser. Nos. 09/695,816 and 10/141,906 entitled "Mobile Monolithic Polymer Elements for Flow Control in Microfluidic Devices" filed Oct. 24, 2000 and May 8, 2002; and Ser. No. 10/245,224 entitled "Fluorinated Silica Microchannel Surfaces" filed Sep. 16, 2002, incorporated herein by reference in their entirety, hold great potential for sophisticated fluid routing on a variety of microfluidic platforms, including those used for chemical analysis, biosensors, toxin detection, chemical separation, combinatorial chemical synthesis, and protein crystallization. In particular, these architectures are unique in their ability to hold off solvents and pressures appropriate for miniaturized HPLC separations.

Although the above-referenced U.S. patent applications disclose and claim monolithic polymer valve architectures designed to control fluid and current flow, the phase-separated polymerization techniques used to prepare the polymer monolithic structures described therein have certain limitations. The ability of polymer microvalve architectures to control fluid flow is dependent on polymer formulations that, when polymerized, have the following properties: (1) they fill the microchannels, preventing flow yet retain mobility; (2) they do not shrink or swell when the running solvent or buffer is changed, so their valving effect works with a variety of solvents; and (3) they insulate electrically when immersed in a conducting fluid.

Property (1) has been well-demonstrated in the prior art using contact lithography techniques or projection lithography for in-situ polymerization in microchannels. Property (2), however, represents a significant challenge since phase-separated porous polymers, in general, will shrink or swell in different solvents in order to reach their minimum potential energy state. This shrinking and swelling can be counteracted by increasing the mechanical strength of the polymer, but cannot be eliminated entirely. Property (3) is also a challenge. While the polymer itself is an insulator and has a high dielectric strength, conduction through the fluid that fills the pores of the porous polymer monolith can allow a current flow that can be a significant fraction of the open-channel conductivity.

SUMMARY OF THE INVENTION

The invention is directed, in part, to a method and polymer formulations for fabricating mobile polymer monolith valves within microchannels that are distinct from the prior art. Whereas in the prior art referenced above, a microvalve comprised a porous polymer monolith wherein the valving function was dependent solely on the movement of this porous polymer monolith inside a microchannel, the present invention provides a valve that comprises a combination of a porous polymer monolith and its pore-filling fluid. It is this combination that provides the valving function within a microchannel.

The cast-in-place fluid-filled mobile polymer monolith valves disclosed and claimed herein have fundamentally improved fluid and current flow handling capabilities as compared to prior art polymer monolith valves. The microvalves, comprising a fluorinated polymer monolith and the high dielectric strength fluid that comprises its interstitial or pore-filling fluid, have a combined high dielectric strength ($\approx 12$ V/$\mu$m), roughly equivalent to that of the glass substrate in which they are fabricated. Further, these microvalves have a conductivity of about $10^{-15}$ S/cm, making them effectively perfect insulators. Finally, since the formulations disclosed herein produce heavily fluorinated polymers with perfluorinated pore-filling fluids, these microvalves possess low friction coefficients, low surface energy, and low chemical reactivity. In turn, these properties lead to valve architectures that have low actuation pressures, low leak rates, and a resistance to chemical degradation or adsorption of analytes.

DETAILED DESCRIPTION OF THE INVENTION

Microvalves having cast-in-place polymer monolithic elements for fluid flow control as described herein, can be fabricated using a technique similar to that disclosed in above-referenced U.S. patent application Ser. Nos. 09/695,816 and 10/141,906 (i.e., localized photoinitiation of a phase-separated polymerization process inside microchannels). However, unlike the referenced prior art, the use of fundamentally different chemistry leads to a porous polymer monolith that retains the solvent used for fabrication. In the prior art, the solvent was flushed from the polymer pores during a flushing step so that the pores of the monolith were subsequently filled with a running buffer or solvent. In the present invention, the solvent remains inside the pores when the microchannels are flushed following the polymerization step. Moreover, the fluorinated solvent used for fabrication is essentially inert and immiscible with solvents that can be used for subsequent operations (such as water, acetonitrile, alcohols, ketones, and alkanes). Since both the polymer and its associated solvent (typically a perfluorinated liquid) are high-dielectric-strength insulators, the valve (now consisting of the polymer monolith and the pore-filing fluorinated solvent) is an excellent insulator and can hold off high voltages. Furthermore, the physical basis for polymer swelling and shrinkage (achieving minimum potential energy by changing the fluid-polymer interface area) is completely eliminated since substantially all of the polymer's internal surface area (porosity) is in contact with the pore-filling fluid rather than the fluid whose flow is being controlled. The maximum pressure that the valves can hold off without failure (where failure is defined as forcing the original fluid out of the pores of the polymer monolith) can be described using analysis and relations typically used for Hg porosimetry (Mayer and Stowe, *J. Coll. Int Sci.*, 20, 893–911, 1965). This problem is roughly equivalent, since it consists of forcing a non-wetting fluid (the test fluid) into a porous matrix filled with the wetting fluid. Thus the pressure holdoff capability before failure will be a function of the pore size. Pore diameters of 30 nm will lead to pressure holdoff capabilities larger than the mechanical strength of the microchannel substrate itself.

As used herein, the term "microfluidic" refers to a system or device having channels or chambers that are generally fabricated on the micron or submicron scale, e.g., having at least one cross-sectional dimension in the range from about 0.1 µm to about 500 µm, i.e., microchannels. While the structure and function of the invention will be described and illustrated in relation to the microchannels and arrangements thereof it is understood that the microchannels themselves can be part of a microfluidic device. The microfluidic device can be comprised of channels, reservoirs, and arbitrarily shaped cavities that are fabricated using any of a number of art recognized microfabrication methods, including injection molding, hot embossing, wet or dry etching, or deposition over a sacrificial layer. The microfluidic device can also include holes and/or ports and/or connectors to adapt the microfluidic channels and reservoirs to external fluid handling devices. The terms "channel" and "microchannel" are used herein interchangeably and synonymously.

A technique for fabricating these polymer monoliths includes the following: a mixture is made comprising a fluorinated solvent, preferably a perfluorinated liquid, a singly-functional fluorinated monomer, a multiply-functional fluorinated cross-linker, and a photoinitiator. Solvents can be selected from a family of inert, high-dielectric-strength liquids such as Fluorinert® liquids available from the 3M Corporation (e.g., FC-72®, FC-87®, FC-3283®). Monomers and cross-linkers are chosen that are miscible with the solvent and each other, and that are extensively fluorinated. Examples of monomers include, but are not limited to, trifluoroethyl acrylate, tetrafluoro propyl acrylate, hexafluorobutyl acrylate, heptafluorobutyl acrylate or methacrylate equivalents. Examples of cross-linkers include but are not limited to 2,2,3,3 tetrafluoro 1,4 butanediol diacrylate; 2,2,3,3,4,4 hexafluoro 1,5 pentanediol diacrylate; 2,2,3,3,4,4,5,5 octafluoro 1,6 hexanediol diacrylate; 1-(1,1 dihydroperfluorononyl) 1,3 propane diol diacrylate; or methacrylate equivalents. Fluorination in monomers and cross-linkers is necessary for solubility in perfluorinated solvents, and, as discussed above, leads to a polymer monolith with a low friction coefficient and good resistance to analyte adsorption. Photoinitiators are chosen that are soluble in these mixtures and compatible with the wavelengths of light used for photoinitiation, e.g., AIBN (2,2' asobisisobutyronitrile). This mixture is injected into a microchannel of glass, plastic, or silicon. Localized phase separation polymerization is induced in-situ by using light from a shaped radiation source such as a laser beam. A shaped laser beam from a frequency-doubled Nd:YAG laser operating at 10 Hz has been found to be particularly effective. Polymerization typically occurs in about 10–90 seconds. The shape of the laser beam can be controlled by means known in the art such as cylindrical or spherical optics, or for complicated shapes, imaging a template from a mask. The region defined by the intersection of the open channel area and the laser beam shape determines the eventual geometry of the polymer monolith. The unpolymerized fluid outside the illuminated region is flushed, leaving a mobile element consisting of a polymer monolith filled with an inert, high-dielectric-strength liquid.

The following example illustrates generally a method for preparing mobile monolithic polymer materials as valving elements in capillaries and microchannels, in accordance with the present invention. This example only serves to illustrate the invention and is not intended to be limiting. Modifications and variations may become apparent to those skilled in the art, however these modifications and variations come within the scope of the appended claims. Only the scope and content of the claims limit the invention.

EXAMPLE 1

A 1:1:1 mixture comprising the monomer heptafluorobutyl acrylate, the crosslinker 2,2,3,3,4,4,5,5 octafluoro 1,6 hexanediol diacrylate, and the solvent FC-72® was combined with 1% AIBN by weight, added as a photoinitiator. The mixture was injected into the channels of a wet-etched glass microfluidic chip. The 355 nm emission from a 12 kHz, 800 ps-pulse, 160 nj-pulse, frequency-tripled Nd:YAG laser was focused using projection optics onto a 60 µm×60 µm region of the chip, causing polymerization in that area. Non-irradiated regions were flushed with acetonitrile, leaving a 60 µm×60 µm valve body consisting of a polyacrylate backbone with fluorinated alkyl crosslinkers and side chains. The fluid inside the pores consisted primarily of FC-72®. These valve bodies have been found to have a resistivity of at least about 100 GΩ.

It can be desirable, in some applications, to vary the composition of the porous polymer monolith embodiment described above. Variations can include but are not limited to thermally or photochemically closing pores at either or both ends of the polymer monolith so that the monolith is impermeable and encapsulating a solvent filled porous polymer monolith with a porous polymer material.

We claim:
1. A method for producing a mobile polymer monolith whose pores are substantially filled with an electrically insulating, high dielectric strength fluid, comprising:
   providing a microchannel structure;
   injecting a mixture comprising a fluorinated solvent, a singly-functional fluorinated monomer, a multiply-functional fluorinated cross-linker, and a polymerization initiator into said microchannel structure;

photoinitiating localized polymerization; and flushing unpolymerized monomer from the microchannel.

2. The method of claim 1, wherein the fluorinated monomer includes trifluoroethyl acrylate, tetrafluoro propyl acrylate, hexafluorobutyl acrylate, heptafluorobutyl acrylate or methacrylate equivalents.

3. The method of claim 1, wherein the fluorinated crosslinker includes 2,2,3,3 tetrafluoro 1,4 butanediol diacrylate; 2,2,3,3,4,4 hexafluoro 1,5 pentanediol diacrylate; 2,2,3,3,4,4,5,5 octafluoro 1,6 hexanediol diacrylate; 1-(1,1 dihydroperfluorononyl) 1,3 propane diol diacrylate; or methacrylate equivalents.

4. The method of claim 1, wherein the fluorinated solvent is a perfluorinated liquid.

5. The method of claim 1, wherein said step of photoinitiating is by a laser.

6. The method of claim 5, wherein the laser is a frequency-doubled Nd:YAG laser operating at 10 Hz.

7. The method of claim 1, wherein said step of photoinitiating is by shaped radiation.

8. The method of claim 7, wherein the shaped radiation is shaped laser radiation.

9. The method of claim 8, wherein the laser radiation is radiation from a frequency-doubled Nd:YAG laser operating at 10 Hz.

10. A method for preparing a mobile polymer monolith having pores substantially filled with an electrically insulating, high dielectric strength fluid, comprising the steps of:

providing a wet-etched glass microfluidic chip having a microchannel structure;

injecting a 1:1:1 mixture comprising a perfluorinated solvent, the monomer heptafluorobutyl acrylate, the crosslinker 2,2,3,3,4,4,5,5 octafluoro 1,6 hexanediol diacrylate, and 1% 2,2' azobisisobutyronitrile by weight into the microchannel;

photoinitiating localized polymerization by irradiating a portion of the mixture with the 355 nm emission from a 12 kHz, 800 ps-pulse, 160 nJ-pulse, frequency-tripled Nd:YAG laser; and flushing unpolymerized monomer from the microchannel.

* * * * *